July 14, 1959

J. W. STINEMAN, JR., ET AL 2,894,313

METHOD AND APPARATUS FOR THE CONTROLLED AGING OF SEMICONDUCTOR DEVICES

Filed April 29, 1954

INVENTORS
SAMUEL A. ROBINSON
JACOB W. STINEMAN JR.
BY
Allen V. Hazeltine
ATTORNEY United States Patent Office 2,894,313
Patented July 14, 1959

2,894,313

METHOD AND APPARATUS FOR THE CONTROLLED AGING OF SEMICONDUCTOR DEVICES

Jacob W. Stineman, Jr., Villanova, and Samuel A. Robinson, Lansdale, Pa., assignors to Philco Corporation, Philadelphia, Pa., a corporation of Pennsylvania Application April 29, 1954, Serial No. 426,466

5 Claims. (Cl. 29—25.3)

The present invention relates to methods and apparatus for the electrical treatment, or aging, of semi-conductive devices. More particularly it relates to improved methods and apparatus for producing semiconductive crystal diodes of improved, substantially uniform characteristics.

To attain optimum characteristics for certain semiconductive devices, it has been found necessary to employ an aging procedure in which there is passed through the device an electrical current of a magnitude in excess of that utilized in normal operation of the device. For example, in point-contact diodes utilizing germanium as the semiconductive material, the ratio of the back resistance to the forward resistance existing at the time of the initial application of the point to the crystal surface can be substantially improved by passing a relatively high current through the point contact. Although the details of the physical mechanism by which this aging process improves the electrical properties of the resultant device are not fully understood, various systems of aging have been developed which are highly effective in improving the voltage-current characteristics of such crystal diodes.

However, in employing such aging procedures several difficulties are commonly encountered. First, the exact nature of the aging procedure is relatively critical; if insufficient aging is employed optimum characteristics will not be obtained, while if the device is overly-aged its characteristics may be greatly harmed and the unit may, in fact, become useless for commercial purposes. This difficulty in providing optimum aging is aggravated by the fact that the crystal devices commonly differ among themselves in their physical characteristics, with the result that even if the aging procedure is carefully controlled within narrow limits to provide proper aging on the average, there will in general still be substantial variations among the resultant electrical characteristics of the individual diodes thus produced.

A second important factor in the aging process is its effectiveness in causing the contacting element to adhere to the semiconductor surface. In semiconductive devices which tend to be sensitive to mechanical shock and vibration it is desirable, in the interest of mechanical stability, that an appreciable weld be produced between the contact member and the semiconductor. For example, in crystal diodes designed for use in low-noise microwave mixers, the contacting element ordinarily comprises an exceedingly fine whisker which bears gently upon the semiconductor surface, and is therefore relatively sensitive to mechanical shock. In such cases it is generally desirable that the aging current produce a slight weld between whisker and semiconductor to stabilize the unit against mechanical forces.

Accordingly it is an object of our invention to provide a new and improved method and apparatus for aging point-contact semiconductive devices.

Another object is to provide a method and apparatus capable of producing semiconductive diodes having substantially optimum values of a predetermined electrical characteristic.

A further object is to provide such a process in which the resultant semiconductive device is characterized by improved mechanical characteristics provided by adherence of the conducting member to the semiconductor surface.

Still another object is to provide such devices characterized by improved noise figures.

A further object is to provide automatic apparatus for achieving the above-described objectives.

In accordance with the invention, the above objects are achieved by utilizing an aging process in which electrical pulses of increasing voltage are applied between the contact and the semiconductive body. Preferably that characteristic of the device which is to be optimized is observed in the intervals between pulses and, when the desired value of the characteristic is obtained, the aging pulses are discontinued and the unit is ready for packaging and use.

In a preferred embodiment of the invention wherein the predetermined electrical characteristic to be maintained uniform is the form of the voltage versus current characteristic of a point contact diode, the diode may be connected alternately between the source of aging potential and the measuring apparatus, as by means of a vibrating switch for example. By providing the measuring apparatus with a relatively long time-constant, a substantially continuous indication of the voltage-current curve of the device may be presented, so that an operator may manually increase the amplitude of the aging voltage pulses while simultaneously observing the electrical characteristics until the desired values are indicated, at which time aging may be manually discontinued. However, we have also provided automatic apparatus which is capable of deriving an indication of the electrical characteristic to be controlled, comparing this indication with a standard indicative of the optimum value of the controlled characteristic, and discontinuing aging when the derived indication differs from the standard by less than a predetermined amount.

When this method of aging by voltage pulses of increasing amplitude is utilized, we have also found that the adherence of the whisker to the semiconductive surface is enhanced, thereby improving the mechanical stability of the device. This we believe to be due to the fact that the pulse operation provides greater localization of the heating effect of the current through the contact, thereby augmenting the welding action without producing undesired excessive heating of the interior regions of the crystal. We have also found that, by employing the above-described aging method, the noise figure of the resultant diode, utilized as a microwave mixer for example, is substantially improved over that obtained by previous aging procedures.

Other objects and features of the invention will be readily appreciated from a consideration of the following detailed description taken in connection with the accompanying drawings, in which.

Figures 1, 2:
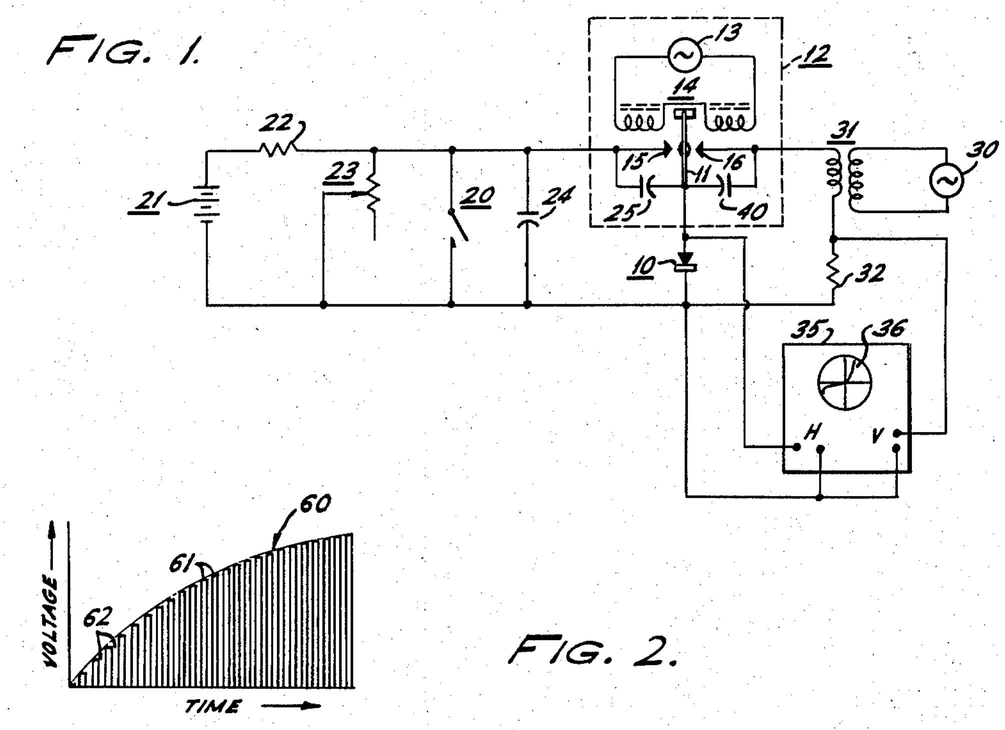
Figure 1 is a schematic diagram of apparatus for producing point-contact crystal rectifiers of improved, uniform electrical characteristics, in accordance with the invention.
Figure 2 is a graphical representation indicating the nature of the aging voltage applied to the semiconductive device under treatment in accordance with the invention.

Referring now to Figure 1 in more detail, crystal diode 10 may suitably be of the low-noise type which has been found especially useful in microwave receivers, for example. Such a diode is described in detail in our copending application Serial No. 306,446, filed August 26, 1952 and entitled Electrical System, and as an example may suitably comprise a wafer of N-type germanium gently contacted by a pointed titanium whisker of about 1¾ mils diameter. It will be understood however that the invention is also applicable to any of a variety of other semiconductive devices which may be improved by similar aging procedures.

The anode of diode 10, which in this instance comprises the contacting whisker, is connected electrically to the moving arm 11 of a vibrating switch 12 which may take any of a variety of well-known forms. As shown, the vibrating switch comprises a source 13 of alternating voltage of a frequency of about 120 c.p.s., for example, across which is connected a magnetic inductor 14 so disposed with respect to vibrating arm 11 as to cause it to contact alternately the contacting elements 15 and 16. Preferably the vibrating switch 12 is of a well-known form in which the time required for the vibrating arm 11 to move between contacts 15 and 16 is relatively small compared to the duration of the complete cycle of vibration so that for substantially one-half of the cycle, i.e. for approximately $\frac{1}{240}$th of a second, the arm 11 is in contact with contact 15, and during nearly all of the other half cycle it is in contact with contact 16. Such apparatus for producing alternate contact to two opposed contacting elements is well known in the art, and need not be described in further detail.

When the vibrating arm 11 is in contact with contacting element 15, the vibrating switch 12 will be designated hereinafter as in the aging position. In this position, and with shorting switch 20 in the open position as shown, potential source 21 is connected between the anode and cathode of diode 10 by way of current-limiting resistor 22. Variable resistor 23, connected in parallel with diode 10, then cooperates with resistor 22 to form a variable voltage divider permitting control of the magnitude of the voltage applied to diode 10. When the variable tap of resistor 23 is in its uppermost position, the voltage supplied to diode 10 is zero, and as the tap is moved downward the voltage applied to the diode is progressively increased. In the present example this voltage is in the direction to produce current in the forward direction through the diode, although it will be understood that a similar process may be employed to age the crystal by reverse currents if so desired.

Also connected across diode 10, when switch arm 11 is in the aging position, is aging condenser 24, the purpose of which is explained hereinafter. In the preferred embodiment of the invention shown, a condenser 25 of relatively small value is also connected between contacting element 15 and the anode of diode 10 to minimize the interfering effects of transient phenomena associated with the closing of the contact, while the above-mentioned shorting switch 20 is provided to permit instantaneous manual removal of the aging potential from diode 10.

The portion of the circuit thus far described is therefore operative to apply, across diode 10, the potential built up across capacitor 24, the magnitude of which in turn depends upon the adjustment of the variable resistance 23. In a typical embodiment, source 21 may provide a potential difference of 45 volts, resistor 22 may have a value of 100 ohms, and variable resistor 23 may be variable from 0 to 1000 ohms, thereby permitting the application across condenser 24 of a voltage variable between 0 and about 40 volts.

When vibrating arm 11 is in its opposite position so as to be in contact with contacting element 16, the switch 12 is designated hereinafter as in its measuring position. In this position, a varying voltage is applied across crystal diode 10 and the resultant current through the diode is measured, the applied voltage and the resultant current then being displayed to indicate the voltage-versus-current characteristic of the diode. Thus, with arm 11 in the measuring position, a source 30 of varying voltage induces, by means of transformer 31, a corresponding voltage across diode 10, this voltage suitably and conveniently being 60-cycle alternating line current, although other frequencies may also be employed. Diode 10, the secondary of transformer 31 and resistor 32 then form a series circuit, resistor 32 preferably having a resistance low compared to the forward resistance of diode 10, for example one ohm, so that the voltage across the resistor constitutes a direct indication of the current through the diode 10 produced in response to the applied voltage from source 30. The measuring voltage developed across diode 10 may then be applied to the horizontal deflecting input terminals of oscilloscope 35, while the voltage across resistor 32 may be applied to the vertical deflecting input terminals thereof as shown. The display 36, formed upon the face of the cathode-ray tube of oscilloscope 35, will then comprise a graphical representation in rectilinear coordinates of the voltage versus current characteristic of diode 10, the voltage being indicated by abscissae and the current by ordinates of the graph.

A condenser 40 of small value, for example 0.002 microfarads, is preferably also connected between contacting element 16 and vibrating arm 11 to minimize interfering transient phenomena associated with the switching action.

Thus far the apparatus of Figure 1 has been described with reference to its static characteristics. However, in actual operation the procedure will normally be as follows. Shorting switch 20 may initially be closed to prevent the application of aging potential to diode 10, and variable resistor 23 moved to its minimum potential position, in the drawing corresponding to moving the variable tap to the top of the resistive portion of the device. Under these conditions, capacitor 24 will be substantially completely discharged. Diode 10 may then be connected in the circuit as shown, the vibrating switch 12 actuated to produce alternation of arm 11 between the contacting elements 15 and 16, and the varying potential source 30 and oscilloscope 35 adjusted to provide a graphical display 36 of convenient form. The diode 10 is then ready for aging, which is accomplished by opening switch 20 and moving the variable tap of resistor 23 so as to increase gradually the voltage across capacitor 24. Due to the vibratory motion of arm 11, diode 10 is then subjected to pulses of aging current passed therethrough in the forward direction from the aging circuit, and, in the intervening intervals between successive aging pulses, indications of the voltage-versus current characteristic of the diode are derived for display upon oscilloscope 35. Preferably, the persistence of the phosphor of the oscilloscope 35 is such, relative to the persistence of vision of the human eye, that the voltage-versus-current characteristic thereon appears to be substantially continuously displayed.

The resistor 23 is then varied so as to increase the amplitude of the voltage pulses applied to the crystal until the voltage-versus-current characteristic displayed on oscilloscope 35 assumes the desired optimum form, at which time switch 20 may be closed to terminate instantaneously the aging procedure and resistor 23 returned to its original position.

The operation of the embodiment of Figure 1 will be more fully understood from a consideration of Figure 2, which is a graphical representation of the voltage applied across diode 10 from the aging circuit. In the figure, ordinates represent the magnitude of the applied voltage, while abscissae represent the passage of time from the instant at which adjustment of resistor 23 is begun. It will be understood that Figure 2 is for descriptive purposes only and not necessarily to scale, particularly in that the durations of the individual pulsing cycles have been exaggerated relative to the total duration of the aging cycle in the interest of clarity of exposition. In this figure, the envelope 60 of the pulses of voltage indicates the rising voltage developed across capacitor 24 by adjustment of resistor 23, while the individual pulses such as 61 indicate the voltages actually applied across diode 10 during the intervals in which arm 11 is in contact with contacting element 15. With a frequency of alternation of switch arm 11 of about 120 cycles per second, the pulses 61 will typically have a duration of approximately 4 milliseconds, and the intervals such as 62 between successive pulses will be of substantially equal duration. It is during these latter intervals that information as to the voltage-versus-current characteristic of the diode is derived for display on oscilloscope 35.

Figure 3:
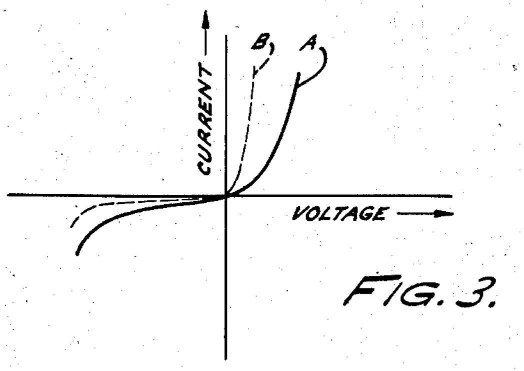
Figure 3 is a graphical representation to which reference will be made in describing one application of the invention to the aging of crystal diodes.

Figure 3 shows in more detail the nature of the display provided by oscilloscope 35, in accordance with which the proper time for terminating aging is determined. In this instance, abscissae represent voltages across the diode 10, while ordinates are indicative of the current through the diode. Solid curve A then represents the voltage versus current characteristic of diode 10 before aging is initiated, while dotted curve B represents the optimum or standard characteristic which it is desired to produce by the aging procedure. If desired, the standard curve B may be marked upon a translucent screen in front of the cathode ray tube of oscilloscope 35 for convenient comparison. The above-described gradual increase in the amplitude of the applied voltage pulses, by means of variation of resistance 23, is therefore continued until the cathode-ray trace A has moved to the optimum or standard position B, at which time aging is discontinued. In this way all diodes are brought to the same electrical condition.

The adjustment of the various parameters of the system in any particular application depends upon the nature of the diodes to be aged and the criterion of satisfactory performance which is utilized. However, as an example only, in the case of the low-noise mixer crystal described herein above the time interval within which the aging pulses are increased from minimum to maximum amplitude may be of the order of a few seconds, the maximum amplitude of the voltage pulses across the diode being of the order of 1 to 2 volts, and the maximum aging current of the order of 100 milliamperes. As a result of this procedure, the forward resistance is substantially decreased and the back resistance is substantially increased, improvement factors of two-to-one for both forward and back resistance being typical. Furthermore, we have found that a superior weld is formed between the whisker and the semiconductor when our pulse-aging procedure is utilized than when continuous aging is employed. This we attribute to the greater concentration of heat in the immediate vicinity of the contact which is made possible by the utilization of pulses of relatively high amplitude and short duration. In addition we have found that the diodes manufactured by the above-described process are characterized by noise figures which are typically two or three decibels less than those obtained by prior art procedures.

Thus far no mention has been made of the factors determining the value of the capacitor 24. The purpose of this capacitor is to prevent the applied aging voltage from dropping rapidly when it is applied to the relatively low-resistance diode, thereby to insure a satisfactory light weld between crystal and whisker. We have found that, for best welding of the whisker to the semiconductor, capacitor 24 should have a relatively high value, e.g. of the order of 0.5 microfarads for example.

Figure 4:
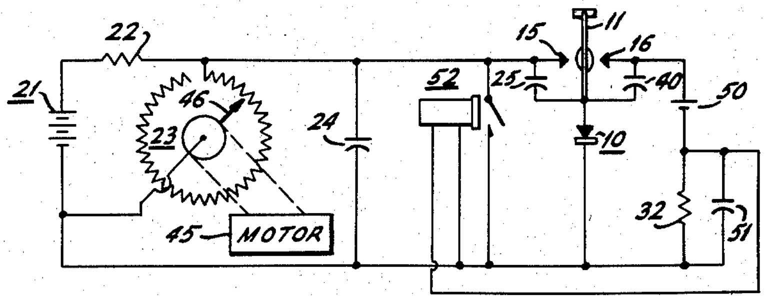
Figure 4 is a schematic diagram, partially in block form, of an automatic system for accomplishing the production of semiconductive devices of improved uniformity in accordance with the invention.

As is shown in Figure 4, our invention may also be bodied in apparatus in which the increases in the amplitude of the applied aging pulses, and the termination of the aging procedure upon the attainment of the desired characteristics, may be completely automatically performed. In Figure 4, in which numerals corresponding to those in Figure 1 represent corresponding parts, diode 10 again has associated therewith an aging circuit and a measuring circuit, as well as a switching device for alternately connecting the measuring and aging circuits to the diode. As in Figure 1, the potential source 21 supplies the aging potential by way of current-limiting resistor 22 and variable resistor 23 to contacting element 15, condensers 24 and 25 being utilized for the same purpose as in Figure 1. However, in the present arrangement variable resistor 23 is automatically caused to vary its resistance during the aging process. For this purpose motor 45 may be mechanically coupled to the rotatable arm 46 of variable resistor 23 so as drive arm 46, from the position in which substantially no voltage is supplied to diode 10, clockwise so as to apply ever-increasing voltages to the diode. For convenience the coupling between motor 45 and variable resistor 23 may suitably be such as to provide automatic reset of arm 46 to its starting position after removal of the crystal being aged.

In the present embodiment, the testing circuit shown is a simplified one, selected in the interest of clarity of exposition, in which the measuring voltage applied to the diode is supplied by reference battery cell 50, rather than by the source of alternating voltage of Figure 1; in other respects the measuring circuit may be similar to that of Figure 1. The use of such a fixed voltage for measurement is made possible by the fact that when the diode possesses the desired voltage-versus-current characteristic, application of a known reference voltage will ordinarily produce a unique value of current through the diode, and attainment of this current may therefore be utilized as a criterion of proper aging. As an example, the reference source 50 may be a one-half volt battery, producing a current of 0.020 amperes in a properly aged crystal. Further, since the measuring circuit is connected to the diode only intermittently, the current through current measuring resistor 32 is intermittent, and for this reason it will be conventient in this present embodiment to employ a smoothing condenser 51 in parallel with resistor 32 to provide a time constant which is preferably larger than the interval between successive pulses but short compared to the total aging cycle duration. The voltage developed across the current measuring resistor 32 is then applied to the primary of a sensitive relay device 52, which operates to produce a short circuit across the output terminals of the aging circuit and thereby to discontinue the aging process when the current through resistor 32 exceeds a predetermined value.

In the general operation of Figure 4, the motor 45 turns arm 46 clockwise, automatically to produce increasing amplitudes of voltage pulses across diode 10 until the voltage developed across resistor 32 in response to the potential of reference source 50 reaches the desired value, typically 0.02 volt in the case of a one-ohm measuring resistor. The latter voltage then actuates relay 52 to discontinue further aging. It is therefore seen that, with appropriate adjustment, the system operates automatically to age the diode to the desired optimum value, and then to terminate aging. If, in some cases, the lag in the response of the measuring circuit due to the inertia of capacitor 51 is objectionably large, the relay control circuit may suitably be adjusted to operate on a slightly smaller current through resistor 32. This may readily be accomplished by using a slightly larger value of measuring resistor 32.

Although the invention has been described with particular reference to certain specific embodiments thereof, it will be apparent that it is also susceptible of embodiment in a variety of other forms. For example, the characteristic of the diode which is to be optimized by the aging procedure may in some instances be other than the current-versus-voltage characteristic. Thus one may utilize, as a measuring circuit, apparatus for continuously producing an indication of the noise figure of the diode, in which case aging may be caused to terminate when the minimum noise figure has been achieved. Further, in other embodiments of the invention utilizing automatic control, one may suitably use electronic means to sweep the aging voltage through its cycle, and electric measuring means widely different from that exemplified may be utilized to terminate aging when the current voltage characteristic has a predetermined form.

We claim:

1. Apparatus for controlledly aging a point-contract rectifier, comprising an aging circuit for applying an aging potential to said rectifier to modify a predetermined characteristic thereof, a measuring circuit for measuring said characteristic, means for automatically connecting said rectifier alternately to said aging and measuring circuits, means for increasing the magnitude of said aging potential while said alternations are occurring, and means for discontinuing said application of said aging potential to said diode when said characteristic attains a predetermined value.

2. A method of aging a semiconductor point-contact rectifier of the low-noise mixer type in which a body of N-type germanium is contacted by a metallic whisker of a diameter of less than about 2 mils, which method comprises the steps of applying to said whisker unidirectional time-spaced pulses of potential positive with respect to said body thereby to pass current intermittently through said point-contact in the direction of easier current flow and to increase the reverse resistance of said rectifier, the total period of application of said pulses being of the order of a few seconds, said pulses being short compared with the total period of said aging and being regularly-recurrent at intervals short compared with a second, progressively increasing the amplitude of said pulses during said period of application to a value of at least about 2 volts, and terminating said application of pulses when the desired increase in reverse resistance of said rectifier occurs.

3. The method of claim 2, in which measuring voltages having maximum values algebraically less than the maximum amplitudes of said aging pulses are applied between said whisker and said semiconductive body during the intervals between said aging pulses.

4. Apparatus in accordance with claim 1, in which said characteristic to be measured is the current-versus-voltage characteristic of said rectifier throughout a predetermined range of positive and negative voltages, and in which said measuring circuit comprises means for generating and applying to said automatic connecting means a recurrent sweep voltage varying throughout said predetermined range in a time long compared with the period of alternation of said automatic connecting means.

5. The apparatus of claim 4, in which said measuring means further comprises means for deriving signals indicative of the current produced in said rectifier by said sweep voltage during periods of connection of said rectifier to said measuring means, and oscilloscopic means supplied with said sweep voltage and with said signals for displaying said current-versus-voltage characteristics.

References Cited in the file of this patent

UNITED STATES PATENTS

| | | |
|---|---|---|
| 2,422,192 | Fry | June 17, 1947 |
| 2,459,849 | Stateman | Jan. 25, 1949 |
| 2,669,004 | Blair | Feb. 16, 1954 |